United States Patent
Paisley

(10) Patent No.: US 10,332,203 B2
(45) Date of Patent: Jun. 25, 2019

(54) SYSTEMS AND METHODS FOR FACILITATING CREDIT CARD APPLICATION TRANSACTIONS

(71) Applicant: NCR CORPORATION, Duluth, GA (US)

(72) Inventor: Dennis Paisley, Johns Creek, GA (US)

(73) Assignee: NCR Corporation, Atlanta, GA (US)

(*) Notice: Subject to any disclaimer, the term of this patent is extended or adjusted under 35 U.S.C. 154(b) by 0 days.

(21) Appl. No.: 13/722,059

(22) Filed: Dec. 20, 2012

(65) Prior Publication Data

US 2014/0180906 A1     Jun. 26, 2014

(51) Int. Cl.
   *G06Q 40/00*     (2012.01)
   *G06Q 40/02*     (2012.01)

(52) U.S. Cl.
   CPC ........... *G06Q 40/025* (2013.01); *G06Q 40/00* (2013.01)

(58) Field of Classification Search
   CPC ...... G06Q 40/00; G06Q 40/025; G06Q 40/02; G06Q 20/4037
   USPC ............... 235/380, 381, 379; 705/38, 39, 35
   See application file for complete search history.

(56) References Cited

U.S. PATENT DOCUMENTS

| | | | |
|---|---|---|---|
| 3,564,210 A * | 2/1971 | Presti | 235/380 |
| 3,594,727 A * | 7/1971 | Braun | 235/379 |
| 3,818,187 A * | 6/1974 | Lovendusky et al. | 235/380 |
| 3,941,977 A * | 3/1976 | Voss et al. | 235/379 |
| 3,956,615 A * | 5/1976 | Anderson et al. | 705/72 |
| 4,194,242 A * | 3/1980 | Robbins | 705/38 |
| 4,256,955 A * | 3/1981 | Giraud et al. | 235/380 |
| 4,395,626 A * | 7/1983 | Barker et al. | 235/381 |
| 4,472,626 A * | 9/1984 | Frid | 235/379 |
| 4,562,341 A * | 12/1985 | Ohmae et al. | 235/379 |
| 4,718,009 A * | 1/1988 | Cuervo | 705/38 |
| 4,727,243 A * | 2/1988 | Savar | 705/17 |
| 7,364,073 B2 * | 4/2008 | Webb | 235/384 |
| 7,397,151 B2 | 7/2008 | Ishino | |
| 7,701,181 B2 | 4/2010 | Inoue | |
| 8,096,469 B2 * | 1/2012 | Webb | 235/381 |
| 8,322,619 B2 * | 12/2012 | Sullivan et al. | 235/462.01 |
| 8,657,197 B2 * | 2/2014 | Sullivan et al. | 235/462.01 |
| 9,047,600 B2 * | 6/2015 | Zhou | G06Q 20/322 |
| 9,047,617 B2 * | 6/2015 | Sanchez et al. | |
| 9,082,119 B2 * | 7/2015 | Ortiz et al. | |
| 2005/0125336 A1 * | 6/2005 | Rosenblatt et al. | 705/39 |
| 2005/0173520 A1 * | 8/2005 | Jaros et al. | 235/381 |

(Continued)

OTHER PUBLICATIONS

Karnouskos et al "Movile Payment: A Journey Through Existing Procedures and Standardization Initiatives" 2004, IEEE Communicaitons, Fourth Quarter 2004, vol. 6 No. 4, pp. 44-66.*

(Continued)

*Primary Examiner* — Kelly S Campen
(74) *Attorney, Agent, or Firm* — Schwegman, Lundberg & Woessner

(57) ABSTRACT

Credit card application information is requested from a user. A credit card application information is provided to a credit authorization server for credit approval based on the credit card application information. Additionally, an indication is received for credit approval of the user from the credit authorization server. The indication includes a graphical representation of credit information and the graphical represented displayed for use in completing a payment transaction.

14 Claims, 4 Drawing Sheets

(56) References Cited

U.S. PATENT DOCUMENTS

| | | |
|---|---|---|
| 2007/0145120 A1* | 6/2007 | Webb .......................... 235/380 |
| 2009/0072023 A1* | 3/2009 | Webb .......................... 235/380 |
| 2013/0054752 A1* | 2/2013 | Herwig ....................... 709/219 |
| 2014/0006259 A1* | 1/2014 | Grigg et al. .................... 705/39 |
| 2014/0067492 A1* | 3/2014 | Turner .......................... 705/13 |
| 2014/0067680 A1* | 3/2014 | Turner .......................... 705/44 |
| 2014/0070001 A1* | 3/2014 | Sanchez et al. ............. 235/380 |
| 2014/0108263 A1* | 4/2014 | Ortiz et al. ..................... 705/71 |
| 2014/0330656 A1* | 11/2014 | Zhou ................... G06Q 20/322 705/16 |
| 2015/0186879 A1* | 7/2015 | Ortiz et al. ..................... 705/44 |
| 2015/0227932 A1* | 8/2015 | Huxham ............. G06Q 20/027 705/76 |

OTHER PUBLICATIONS

Bar-Gill et al "Making Credit Safer" Nov. 2008 U.PA. L. REV vol. 157, No. 1.*

\* cited by examiner

SYSTEMS AND METHODS FOR FACILITATING CREDIT CARD APPLICATION TRANSACTIONS

BACKGROUND OF THE INVENTION

The proliferation of credit cards has led to many vendors offering store-branded (i.e., private label) credit cards to their customers. Typically, during the checkout and payment process, a store clerk will ask the customer if he or she is interested in applying for such a credit card. At this point, the customer, if interested, may be asked to fill out a credit card application form and wait for submission and approval prior to continuing with the checkout process. As a result, checkout lines may grow longer as delays occur due to customers applying for credit cards. Additionally, credit card applications typically require the disclosure of personal and financial information, which may be exposed to the store clerk and other customers in line. Furthermore, without knowing prior to checkout whether or not they may qualify for a credit card, or for how much credit they may be approved, customers may shop more conservatively thereby inconveniencing the customers and reducing sales.

Accordingly, it may be desirable to provide systems, methods, apparatuses, and computer program products for facilitating credit card application transactions that avoid the above, and other, drawbacks associated with the current art.

BRIEF SUMMARY OF THE INVENTION

Various embodiments of the present invention provide systems, methods, apparatuses, and computer program products for facilitating credit card application transactions. An example method may comprise requesting credit card application information from a user; providing the credit card application information to a credit authorization server for credit approval; receiving an indication of credit approval for the user from the credit authorization server, the indication comprising a graphical representation of credit information; and displaying the graphical representation for use in completing a payment transaction.

Another example method may comprise requesting credit card application information from a user; providing the credit card application information to a credit authorization server for credit approval; receiving an indication of approval of credit for the user from the credit authorization server, the indication comprising credit information; generating a graphical representation of the credit information; and displaying the graphical representation for use in completing a payment transaction.

An example apparatus may comprise at least one processor; and at least one memory comprising computer program code, the at least one memory and the computer program code configured to, with the at least one processor, cause the apparatus at least to: request credit card application information from a user; provide the credit card application information to a credit authorization server for credit approval; receive an indication of approval of credit for the user from the credit authorization server, the indication comprising a graphical representation of credit information; and display the graphical representation for use in completing a payment transaction.

The credit card application information may comprise at least one of a name, address, phone number, social security number, date of birth, employment status, bank account information, investment information, home rental information, and mortgage information.

The credit information may comprise at least one of a type of credit card approved, account number, expiration date, credit limit, and security code.

The graphical representation may comprise at least one of a QR code, a bar code, and a graphical representation of a credit card.

In an example embodiment, requesting credit card application information may further comprise: displaying a credit card application information interface; and receiving input from a user via the interface.

In another example embodiment, requesting credit card application information may further comprise: requesting credit card information automatically after at least one of connecting to a store network, entering a geofence, launching a smart phone app, and launching a web browser.

BRIEF DESCRIPTION OF THE DRAWINGS

Figure 1:
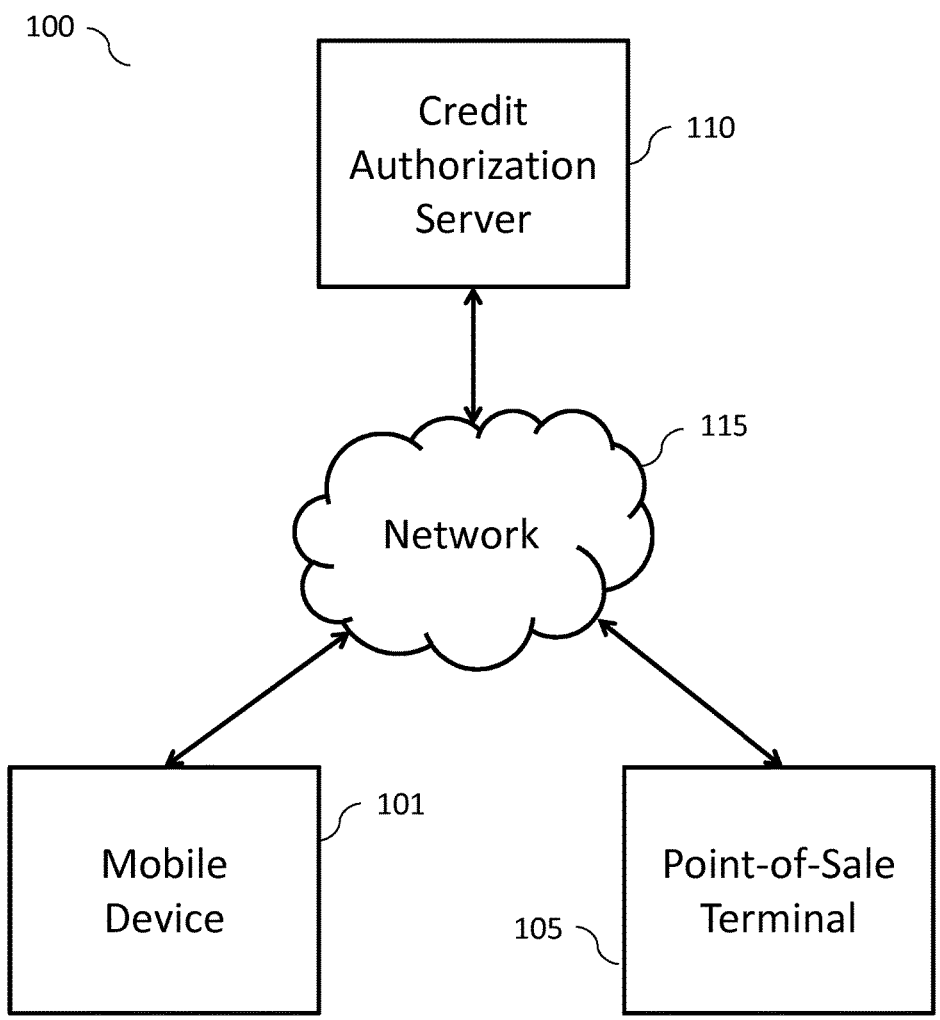

Having thus described the invention in general terms, reference will now be made to the accompanying drawings, which are not necessarily drawn to scale, and wherein:

FIG. 1 provides an illustration of one embodiment of an architecture that can be used to practice various aspects of the present invention.

Figure 2:
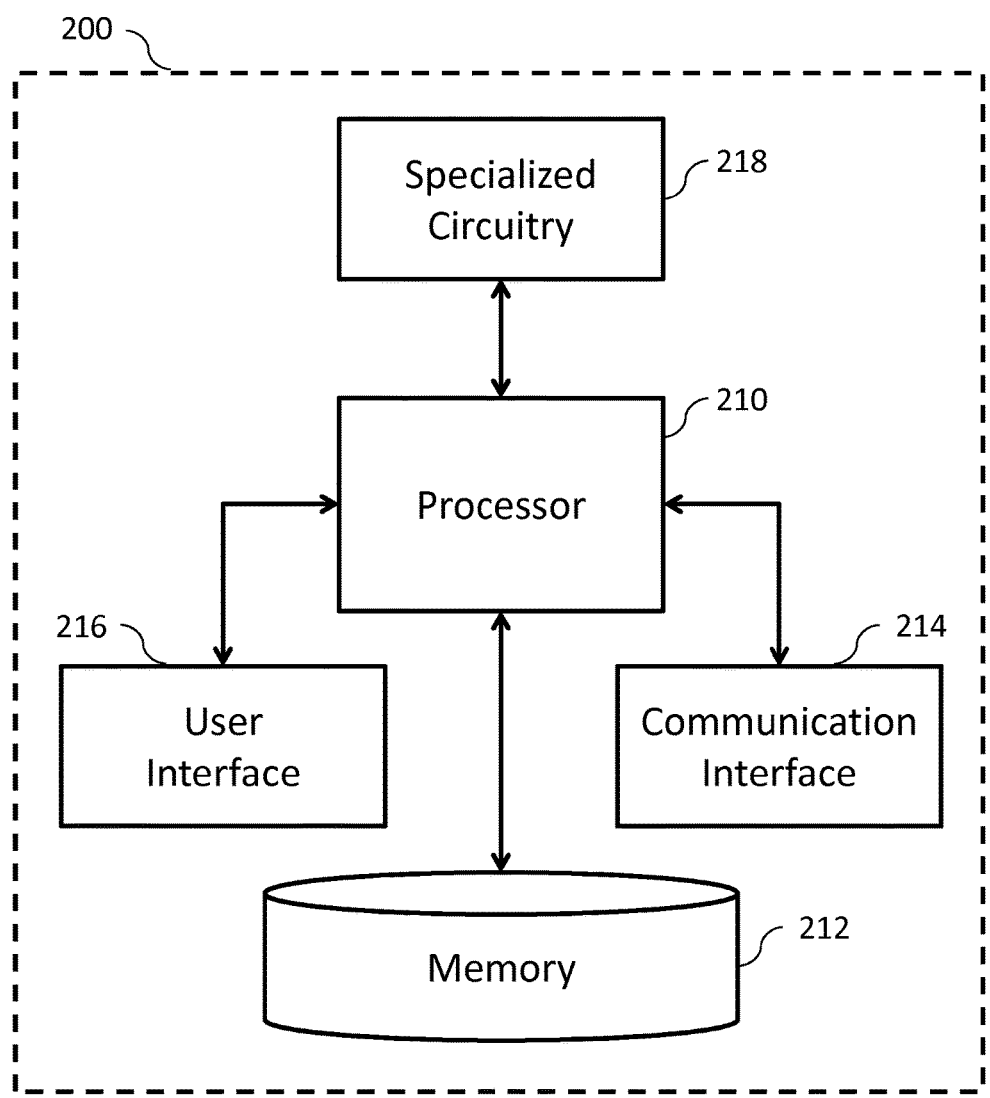

FIG. 2 provides a schematic diagram of a generic apparatus according to an embodiment of the present invention.

Figure 3:
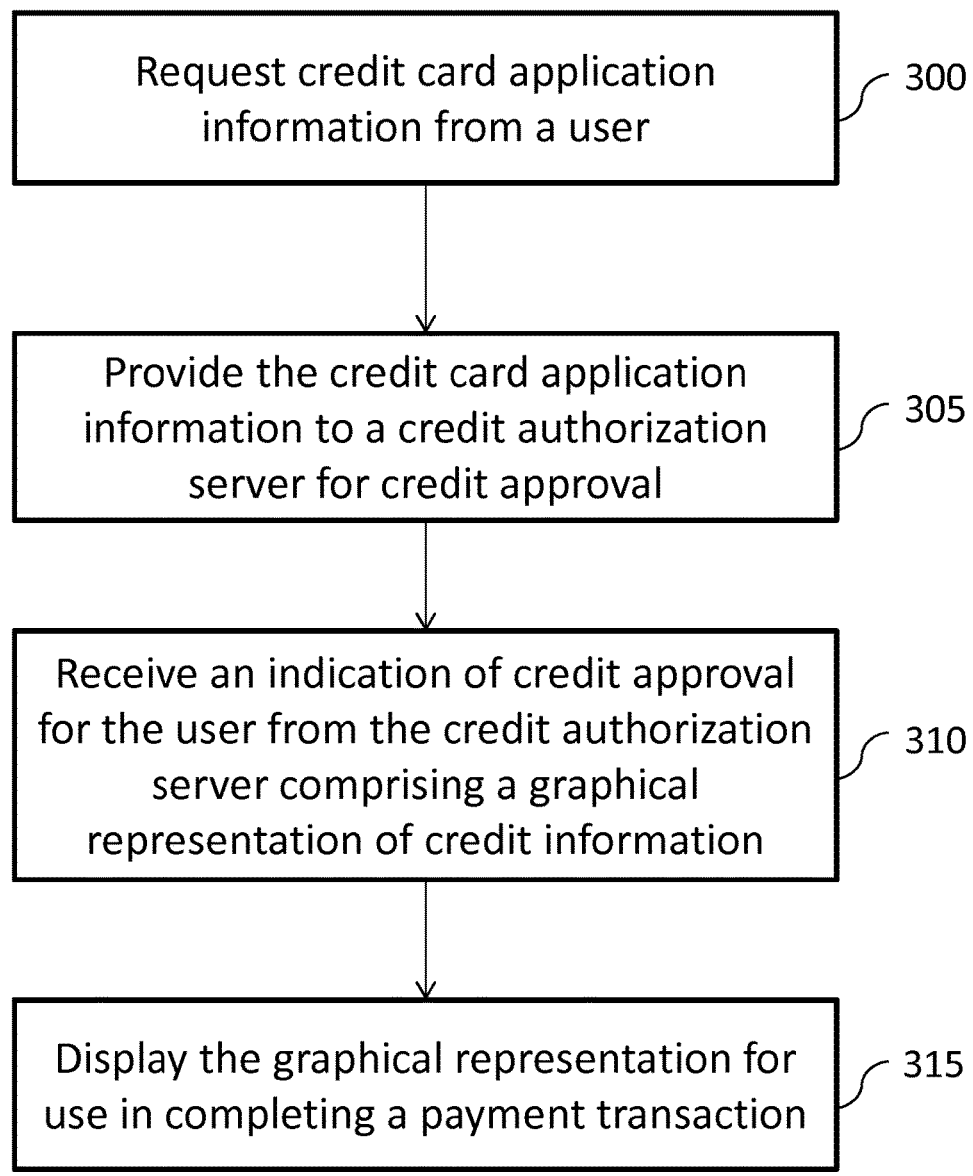

FIG. 3 provides a flowchart for facilitating credit card application transactions according to an embodiment of the present invention.

Figure 4:
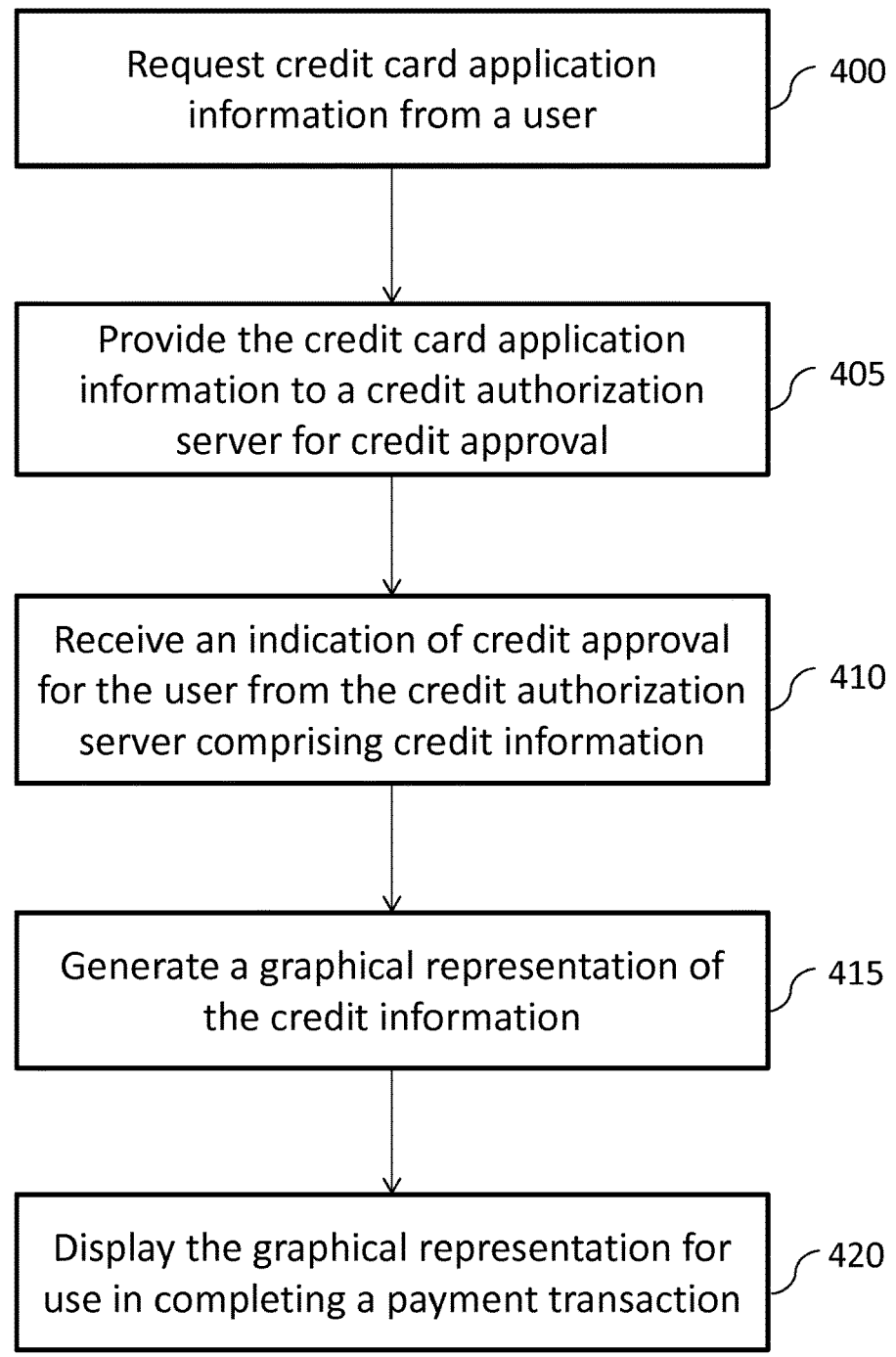

FIG. 4 provides a flowchart for facilitating credit card application transactions according to an embodiment of the present invention.

DETAILED DESCRIPTION OF THE INVENTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. Like numbers refer to like elements throughout.

FIG. 1 provides an illustration of a system 100 that can be used in conjunction with various embodiments of the present invention to facilitate credit card application transactions. As shown in FIG. 1, the system 100 may include one or more mobile devices 101. For instance, a mobile device 101 may comprise a smartphone device, mobile telephone, mobile computer, portable digital assistant (PDA), laptop computer, gaming device, electronic tablet, or any other type of similar electronic device. The system 100 may further include one or more point-of-sale terminals 105. Additionally, the system 100 may comprise one or more credit authorization servers 110. Each entity of the system 100 may be connected, directly or indirectly, to one or more other entities of the system 100 via a network 115. The network 115 may be a wired and/or wireless network comprising one or more of a local area network, wide area network, cellular network, internet, or the like. It should be noted that other system architectures are contemplated that may be used to practice various aspects of the invention. Thus, the system 100 provided in FIG. 1 is for illustrative purposes only and should not be construed to limit the scope of the invention. Further, while FIG. 1 illustrates certain system entities as separate, standalone entities, the various embodiments are not limited to this particular architecture.

In various embodiments, a mobile device 101, a point-of-sale terminal 105, and/or a credit authorization server 110 may be embodied as or otherwise include an apparatus 200 as generically represented by the block diagram of FIG. 2. In the example embodiment, the apparatus 200 may comprise various means for performing the various functions herein described. These means may comprise one or more of a processor 210, memory 212, communication interface 214, user interface 216, or specialized circuitry 218. The various means may be in communication with one another, such as via a bus.

The means of the apparatus 200 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g., memory 212) that is executable by a suitably configured processing device (e.g., the processor 210), or some combination thereof. In some example embodiments, the processor 210, memory 212, communication interface 214, user interface 216, and/or specialized circuitry 218 may be embodied as a chip or chip set.

The processor 210 may, for example, be embodied as various means including circuitry, one or more microprocessors with accompanying digital signal processor(s), one or more processor(s) without an accompanying digital signal processor, one or more coprocessors, one or more multi-core processors, one or more controllers, one or more computers, various other processing elements including integrated circuits such as, for example, an ASIC (application specific integrated circuit) or FPGA (field programmable gate array), one or more other hardware processors, or some combination thereof. Although illustrated in FIG. 2 as a single processor, in some embodiments the processor 210 may comprise a plurality of processors. The plurality of processors may be in operative communication with each other and may be collectively configured to perform one or more functionalities of the apparatus 200 as described herein. The plurality of processors may be embodied on a single device or distributed across a plurality of devices collectively configured to function as the apparatus 200.

In some example embodiments, the processor 210 may be configured to execute instructions stored in the memory 212 or memory otherwise accessible to the processor 210. These instructions, when executed by the processor 210, may cause the apparatus 200 to perform one or more of the functionalities of the apparatus 200 as described herein. Further, the processor 210 may comprise functionality to operate one or more software programs, which may be stored in memory. For example, the processor 210 may be capable of operating a connectivity program, such as a web browser. The connectivity program may allow the apparatus 200 to transmit and receive web content, such as location-based content, according to a protocol, such as Wireless Application Protocol (WAP), hypertext transfer protocol (HTTP), and/or the like. The apparatus 200 may be capable of using protocol(s), such as Transmission Control Protocol/Internet Protocol (TCP/IP), to transmit and receive web content across the internet or other networks.

The memory 212 may comprise, for example, volatile memory, non-volatile memory, or some combination thereof. In this regard, the memory 212 may comprise one or more tangible and/or non-transitory computer-readable storage media that may include volatile and/or non-volatile memory. Although illustrated in FIG. 2 as a single memory, the memory 212 may comprise a plurality of memories. The plurality of memories may be embodied on a single device or may be distributed across a plurality of devices collectively configured to function as the apparatus 200. In various example embodiments, the memory 212 may comprise a magnetic storage device (e.g., hard disk), dynamic and/or static random access memory (RAM), read only memory (ROM), cache memory, flash memory, optical disc, subscriber identity module (SIM), removable user identity module (R-UIM), circuitry configured to store information, or some combination thereof. The memory 212 may be configured to store information, data, applications (e.g., software programs), instructions, and/or the like, in some instances for execution by the processor 210, for enabling the apparatus 200 to carry out various functions in accordance with various example embodiments.

The communication interface 214 may be embodied as any device or means embodied in circuitry, hardware, a computer program product comprising computer readable program instructions stored on a computer readable medium (for example, the memory 212) and executed by a processing device (for example, the processor 210), or a combination thereof that is configured to receive and/or transmit data from/to another computing device. The communication interface 214 may include, for example, an antenna, a transmitter, a receiver, a transceiver, and/or supporting hardware or software for enabling communications with one or more remote devices. The communication interface 214 may be configured to receive and/or transmit data using any protocol that may be used for communications between devices.

The user interface 216 may be in communication with the processor 210 to receive an indication of a user input and/or to provide an audible, visual, mechanical, or other output to a user. As such, the user interface 216 may include, for example, a keyboard, keypad, scanner, printer, mouse, joystick, display (e.g., touch screen display), microphone, speaker, and/or other input/output mechanisms. The processor 210 and/or user interface circuitry comprising the processor 210 may be configured to control one or more functions of the user interface 216 through computer program instructions (e.g., software and/or firmware) stored on memory (e.g., memory 212) accessible to the processor 210.

The specialized circuitry 218 may be embodied as various means, such as circuitry, hardware, a computer program product comprising computer readable program instructions stored on a computer readable medium (for example, the memory 212) and executed by a processing device (for example, the processor 210), or some combination thereof and, in some embodiments, is embodied as or otherwise controlled by the processor 210.

FIG. 3 provides a flowchart according to an example method for facilitating credit card application transactions. The operations performed by a method, apparatus, and computer program product of this example embodiment are illustrated from the perspective of an apparatus 200 embodied as a mobile device 101. The apparatus 200 embodied by the mobile device 101 may comprise means, such as the specialization circuitry 218, the processor 210, or the like. In this example embodiment, the various operations may be performed by the specialized circuitry 218 embodied as credit card application circuitry.

According to various embodiments, a customer, or user, may visit a store that allows customers to apply for a credit card. For example, the store may provide a store-branded, private label, or other, credit card that the customer may use for purchasing products or services from that particular store and/or for any other purchases outside of that store. In some instances, the use of the store-branded credit card at the store may earn the customer benefits, such as loyalty points or discounts. According to example embodiments, the customer may apply for the credit card via an electronic device (e.g., mobile device 101). The electronic device may be the customer's own mobile device or another device provided to the user, or otherwise made available, by the store to allow the customer to apply for a credit card.

In example embodiments, the mobile device 101 of the user may be connected to a network to facilitate the credit card application process. The network may be, for example, a network for which access is provided by the store. In this regard, the network may be a local network (e.g., a Wi-Fi network) with or without access to an external network (e.g., the internet). In some instances, the store may provide open access to the network or the store may provide credential information to customers of the store. For example, the store may display login information (e.g., username and/or password) for the network on signs or other media in or around the store. In other embodiments, the user may complete the credit card application process via a network not affiliated specifically with the store (e.g., a home network, cell network, local network, or the like). While various embodiments contemplate the mobile device 101 facilitating the credit card application process from within or nearby the store, some embodiments permit the mobile device 101 to facilitate the credit card application process from any location.

At operation 300, the mobile device 101 may be configured to request credit card application information. The information may be requested from a user of the mobile device 101, such as a customer in or nearby a store. To facilitate the request, the mobile device 101 may be configured to present an interface to the user for providing the credit card application data. In some instances, the mobile device 101 may display the interface on a screen (e.g., a touchscreen) associated with the mobile device 101.

The display of the interface may be initiated by the mobile device 101 or by the user.

With respect to a mobile device 101 initiated display, the mobile device 101 may automatically perform an action in response to a triggering event. The mobile device 101 may, for example, automatically launch a web browser, web application, smart phone app, or the like containing the interface in response to connecting to the store network. As another example, the mobile device 101 may display a notification or text message to the user in response to connecting to the store network requesting that the user access the interface (e.g., via a web browser or smart phone app). In a further example, the mobile device 101 may navigate to a particular web page containing the interface in response to the user opening a web browser.

In yet another example, the mobile device 101 may perform any of the actions above in response to a geolocation trigger. The geolocation trigger may be detecting that the user carrying the mobile device 101 has moved within a predetermined distance of the store, or inside a designated area within the store. The designated area may be defined as a geofence. In certain instances, the interface may only be available to the user when the mobile device 101 is within the geofenced area, and in some instances the information input into the interface by the user may be deleted if the mobile device 101 moves outside of the geofenced area prior to submitting the information.

With respect to user initiated display, the user may launch a smart phone app or browse to a web page that results in display of the user interface. For example, the store may have signs displaying the name of a smart phone app provided by the store or displaying the address for a store web page, and the user may download and/or launch the app or browse to the website. It should be understood that alternative methods may be used to trigger display of the interface to allow the mobile device 101 to request the credit card application data.

The mobile device 101 may be configured to receive the credit card application data from the user. In this regard, the interface may comprise one or more fields for a user to input information for the credit card application. The credit card application information may comprise personal and/or financial information of the user. For example, the credit card application data may include personal information such as the user's name, address, phone number(s), social security number, date of birth, and/or the like. The financial information may include, for example, the user's income, employment information (e.g., employment status, employer name, etc.), bank account information, investment information, home rental and/or mortgage information, and/or the like. The user may input the requested credit card application information and submit the input information to the mobile device 101 (e.g., by selecting a submit option on the web page or smart phone app interface). The mobile device 101 may receive the submitted information directly (e.g., via a smart phone app installed on the mobile device 101) or indirectly (e.g., via a network, such as from a form submitted on a web page). In some embodiments, the credit card application information may be received via a secure or encrypted connection, for example a Transport Layer Security (TLS) or Secure Sockets Layer (SSL) connection, a Hypertext Transfer Protocol Secure (HTTPS) connection, or any other secure or encrypted connection.

At operation 305, the mobile device 101 may be configured to provide the credit card application information to a credit authorization server 110 for credit approval. Communication between the mobile device 101 and the credit authorization server 110 may be secure and/or encrypted, for example as described above with respect to receiving the credit card application information. The credit authorization server 110 may be associated with the store or, in some instances, may be a third party credit authorization server 110. The credit authorization server 110 may use the credit card application data provided by the mobile device 101 to make a decision on whether to authorize a line of credit for the user and what the features of the line of credit may include.

At operation 310, the mobile device 101 may be configured to receive an indication of approval of credit for the user from the credit authorization server 110. In certain instances, the user's credit card application may be declined. In other instances, the indication received by the mobile device 101 from the credit authorization server 110 may indicate that the user's credit card application is approved. The received indication may further comprise credit information associated with the approved line of credit. For example, the credit information may identify the type of credit card approved, account number, expiration date, credit limit, security code, and/or the like.

In example embodiments, the received indication may comprise a graphical representation of the credit information. The graphical representation may be human readable and/or machine readable. For example, the mobile device 101 may receive a graphical code (e.g., bar code, Quick Response (QR) code, and/or the like) representing all or a portion of the credit information as well as other information associated with the line of credit (e.g., personal information of the user). A QR code has a larger capacity than a bar code and, therefore, may be able to represent more of the credit information in a single code. In some embodiments, the graphical indication may comprise more than one QR code and/or bar code. In another example, the graphical representation may be a graphical image (e.g., a BMP, JPEG, GIF, PNG, and/or the like), for example, of a credit card. In this regard, the graphical representation may be designed to appear similar to the front and/or back of a physical credit card containing the credit information.

At operation 315, the mobile device 101 may be configured to display the graphical representation for use in completing a payment transaction. For example, the mobile device 101 may display the graphical representation to the user so that the user may be informed of the approval or denial of the line of credit as well as, in an instance in which the line of credit is approved, the credit information associated with the line of credit. The user may then use the credit information displayed in the graphical representation to provide payment for a sales transaction (e.g., purchasing a product or service from the store). In other embodiments, the graphical representation may be displayed so that it may be used by a store clerk or point-of-sale device (e.g., a point-of-sale terminal 105). For example, the mobile device 101 may display the graphical representation in such a way that the graphical representation may be scanned by a scanner (e.g., QR code scanner or bar code scanner) associated with the point-of-sale terminal 105. In another example, the mobile device 101 may display the graphical representation in the form of a virtual credit card such that the store clerk may read the credit information and input the information into the point-of-sale terminal 105 or otherwise capture the credit information into the point-of-sale terminal 105.

The point-of-sale terminal 105 may be configured to accept the scanned or otherwise input credit information as payment for a transaction associated with the user. In example embodiments, the point-of-sale terminal 105 may scan the graphical representation in the form of a QR code. The QR code may contain all of the credit information necessary to complete the transaction. In this regard, the point-of-sale terminal 105 may not need to query a separate server (e.g., the credit authorization server 110) to obtain the credit information to complete the transaction.

The point-of-sale terminal 105 may confirm details associated with the credit information of the user. For example, the point-of-sale terminal 105 may verify that the total cost of the transaction does not exceed the credit limit, or available credit, indicated in the credit information. The store clerk may also request identifying information (e.g., a driver's license) from the user to confirm that the user is the person associated with the credit information received by the point-of-sale terminal 105. The point-of-sale terminal 105 may further conduct any other steps typically associated with a point-of-sale terminal 105 completing a sales transaction.

The user may continue to use the graphical representation of the approved credit information on the mobile device 101 on a temporary basis until a physical credit card is issued from the credit card provider.

FIG. 4 provides a flowchart according to an example method for a credit card application transaction. The operations performed by a method, apparatus, and computer program product of this example embodiment are illustrated from the perspective of an apparatus 200 embodied as a mobile device 101. The apparatus 200 embodied by the mobile device 101 may comprise means, such as the specialization circuitry 218, the processor 210, or the like. In this example embodiment, the various operations may be performed by the specialized circuitry 218 embodied as credit card application circuitry.

Operations 400-405 of FIG. 4 are identical to operations 300-305 of FIG. 3, as described above. At operation 410, the mobile device 101 may be configured to receive an indication of approval of credit for the user from the credit authorization server 110, as described above with respect to operation 310 of FIG. 3. In the example embodiment of FIG. 4, however, the indication of the credit information does not comprise a graphical representation of the credit information. For example, the credit information may be received by the mobile device 101 in text form.

At operation 415, the mobile device 101 may be configured to generate a graphical representation of the credit card information. In some instances, the mobile device 101 may generate, for example, a QR code or barcode representing all or a portion of the credit information. In other instances, the mobile device 101 may generate a visual representation (e.g., a BMP, JPEG, GIF, PNG, and/or the like), for example, of a credit card. It should be understood that the mobile device 101 may generate other graphical representations of the credit information without departing from the scope of the invention, and the above examples should not be viewed as limiting.

Operation 420 of the flowchart of FIG. 4 is identical to operation 315 of FIG. 3, as described above.

FIGS. 3 and 4 illustrate a flowchart of a system, method, and computer program product according to example embodiments of the invention. It will be understood that each block of the flowchart, and combinations of blocks in the flowchart, may be implemented by various means, such as hardware and/or a computer program product comprising one or more computer-readable mediums having one or more computer program code instructions, program instructions, or executable computer-readable program code instructions stored therein. For example, one or more of the procedures described herein may be embodied by computer program instructions of a computer program product. In this regard, the computer program product(s) that embodies the procedures described herein may be stored by one or more memory devices (e.g., memory 212) of an apparatus, server, or other computing device (e.g., apparatus 200) and executed by a processor (e.g., processor 210) in the computing device. In some embodiments, the computer program instructions comprising the computer program product(s) that embodies the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s).

Execution of instructions associated with the operations of the flowchart by a processor, or storage of instructions associated with the blocks or operations of the flowchart in a computer-readable storage medium, supports combinations of operations for performing the specified functions. It will also be understood that one or more operations of the flowchart, and combinations of blocks or operations in the flowchart, may be implemented by special purpose hardware-based computer systems and/or processors which perform the specified functions, or combinations of special purpose hardware and program code instructions.

The operations of the methods described herein may be carried out in any suitable order, or simultaneously where appropriate. The methods described herein may be performed by software in machine readable form on a tangible storage medium or as a propagating signal.

Numerous benefits may be realized from the implementation of embodiments of the present invention. In various advantageous embodiments, a customer may apply for a store credit card prior to arriving at checkout, thereby avoiding delays during the checkout process. In other advantageous embodiments, a user may receive approval for a store credit card prior to shopping. In this regard, a user may be aware of the amount of credit available before, rather than at the end, of shopping. Therefore, with prior approval, a customer may be more likely to purchase items they might not have otherwise. Additional advantageous embodiments provide benefits in the form of added privacy for the customer. For example, a user may input all the private and personal information required for a credit card application directly into his or her personal mobile device; the information may be transmitted over secured networks and in some cases encrypted; and the customer need never expose his or her personal information to the store clerk or anyone else in the store. That is, a user may enter all personal and financial information privately and present a not human-readable QR code or bar code to the store clerk to complete a payment transaction. In other advantageous embodiments, the ability to present a QR code containing all necessary credit information avoids the step of a point-of-sale terminal performing a look-up on a server for the credit information during checkout, thereby increasing the efficiency of the process and avoiding delays. For at the least the advantageous reasons above, customers may be more likely to apply for store credit cards.

Various modifications may be made to the above described embodiments within the scope of the invention, for example, in other embodiments the user may apply for a loyalty card instead of a credit card.

In other embodiments, the graphical representation may be replaced by or combined with a text, audio, video, and/or any other form of media representation.

In other embodiments, the mobile device, point-of-sale terminal, and/or store clerk may verify the credit card application information provided by the customer prior to submitting the credit card application to the credit authorization server.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

Unless otherwise indicated by the context, the terms "a" and "an" are used herein to denote at least one of the elements, integers, steps, features, operations, or components mentioned thereafter, but do not exclude additional elements, integers, steps, features, operations, or components.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method, comprising:
    connecting, by executable instructions that execute on a hardware processor from a non-transitory computer-readable storage medium of a mobile device, the mobile device to a store network;
    receiving, by the executable instructions, a dynamically pushed message sent from the store network based on the connecting;
    accessing, by the executable instructions, an interface in response to the receiving of the;
    requesting, from the interface presented on the mobile device to a user operating the mobile device, credit card application information when the mobile device is detected within a geofence of a store based on a geolocation trigger raised by the executable instructions;
    providing, by the interface on the mobile device over an encrypted connection, the credit card application information to a credit authorization server for credit approval while the mobile device is within the geofence of the store in which the user is in or nearby to;
    establishing and maintaining, by the executable instruction, the geofence as a designated area within the store and preventing the credit card information from being provided to the credit authorization server if the user moves outside the geofence before the credit card application is provided to the credit authorization server based on the geolocation trigger;
    receiving, by the interface on the mobile device, an indication of credit approval for the user from the credit authorization server, wherein receiving further includes receiving the indication as an encoded and a graphical representation of credit information;
    displaying, by the interface on the mobile device, the graphical representation for use in completing a payment transaction;
    displaying, by the interface on mobile device, the graphical representation as a Quick Response (QR) code on the mobile device;
    including within the QR code all the credit information for the user including line of credit information and personal information for the user;
    presenting, by the interface on the mobile device, the QR code for scanning at a Point-Of-Sale (POS) terminal to complete the payment transaction between the POS terminal and the user; thereby providing mobile credit processing for mobile acquired credit; and
    completing, by the POS terminal, the payment transaction based on receipt of the QR code by the POS terminal.

2. The method of claim 1, wherein the credit card application information comprises at least one of personal information and financial information.

3. The method of claim 2, wherein the personal information comprises at least one of a name, address, phone number, social security number, and date of birth.

4. The method of claim 2, wherein the financial information comprises at least one of an income, employment status, bank account information, investment information, home rental information, and mortgage information.

5. The method of claim 1, wherein the credit information comprises at least one of a type of credit card, account number, expiration date, credit limit, and security code.

6. The method of claim 1, wherein requesting credit card application information further comprises:
displaying within the interface a credit card application information interface; and
receiving input from a user via the interface.

7. The method of claim 1, wherein requesting credit card application information further comprises:
requesting credit card information automatically after a triggering event.

8. A method, comprising:
connecting, by executable instructions that execute on a hardware processor from a non-transitory computer-readable storage medium of a mobile device, the mobile device to a store network;
receiving, by the executable instructions, a dynamically pushed message based on the connecting;
accessing, by the executable instructions, an interface based on the receiving of the in response to a dynamically pushed message;
requesting, from the interface presented on the mobile device to a user operating the mobile device, credit card application information when the mobile device is detected within a geofence of a store based on a geolocation trigger raised by the executable instructions;
providing, by the interface on the mobile device over an encrypted connection, the credit card application information to a credit authorization server for credit approval while the mobile device is within the geofence of the store in which the user is in or nearby to;
establishing and maintaining, by the executable instructions, the geofence as a designated area within the store and preventing the credit card information from being provided to the credit authorization server if the user moves outside the geofence before the credit card application is provided to the credit authorization server based on the geolocation trigger;
receiving, by the interface on the mobile device, an indication of approval of credit for the user from the credit authorization server, wherein receiving further includes receiving the indication with credit information for the user;
generating, by the interface on the mobile device, a graphical representation of the credit information;
displaying, by the interface on the mobile device, the graphical representation for use in completing a payment transaction;
displaying, by the interface on the mobile device, the graphical representation as a Quick Response (QR) code on the mobile device;
including within the QR code all the credit information for the user including line of credit information and personal information for the user;

presenting, by the interface on the mobile device, the QR code for scanning at a Point-Of-Sale (POS) terminal to complete the payment transaction between the POS terminal and the user; thereby providing mobile credit processing for mobile acquired credit; and
completing, by the POS terminal, the payment transaction based on receipt of the QR code by the POS terminal.

9. The method of claim 8, wherein the credit card application information comprises at least one of a name, address, phone number, social security number, date of birth, income, employment status, bank account information, investment information, home rental information, and mortgage information, and wherein the credit information comprises at least one of a type of credit card, account number, expiration date, credit limit, and security code.

10. The method of claim 8, wherein requesting credit card application information further comprises:
displaying within the interface a credit card application information interface; and
receiving input from a user via the interface.

11. An apparatus for mobile credit processing comprising:
at least one processor; and
at least one memory comprising computer program code, the at least one memory and the computer program code configured to, with the at least one processor executing the computer program code to:
connect the apparatus to a store network;
receive a text message pushed from the store network when the apparatus connects to the store network;
access an interface on receipt of the text message;
request, by the interface on the apparatus, credit card application information from a user when a mobile device is detected within a geofence of a store based on a geolocation trigger raised;
provide, by the interface on the apparatus, the credit card application information to a credit authorization server for credit approval over an encrypted connection and while the mobile device is within the geofence of the store in which the user is in or nearby to;
establish and maintain the geofence as a designated area within the store and remove the credit card information and prevent the credit card information from being provided to the credit authorization server if the user moves outside the geofence before the credit card application is provided to the credit authorization server based on the geolocation trigger;
receive, by the interface, an indication of credit approval for the user from the credit authorization server, and receive the indication as an encoded graphical representation of credit information;
display, by the interface, the graphical representation for use in completing a payment transaction;
display, by the interface, the graphical representation as a Quick Response (QR) code on the apparatus;
include within the QR code all the credit information for the user including line of credit information and personal information for the user;
present, by the interface, the QR code for scan at a Point-Of-Sale (POS) terminal to complete the payment transaction between the POS terminal and the user; thereby providing mobile credit processing for mobile acquired credit; and
complete the payment transaction with the POS terminal based on presentation of the QR code to the POS terminal.

12. The apparatus of claim 11, wherein the credit card application information comprises at least one of a name, address, phone number, social security number, date of birth, income, employment status, bank account information, investment information, home rental information, and mortgage information, and wherein the credit information comprises at least one of a type of credit card, account number, expiration date, credit limit, and security code.

13. The apparatus of claim 11, wherein in order to request credit card application information, the at least one memory and the computer program code are further configured to, with the at least one processor, cause the apparatus to:
   display within the interface a credit card application information interface; and
   receive input from a user via the interface.

14. The apparatus of claim 11, wherein in order to request credit card application information, the at least one memory and the computer program code are further configured to, with the at least one processor, cause the apparatus to:
   request credit card information automatically after at least one of connecting to a store network, entering the geofence, launching a smart phone app, and launching a web browser.

* * * * *